May 3, 1960    J. G. DE REMER    2,935,168
WASHING AND DRYING MACHINE AND DRIVE THEREFOR
Filed April 24, 1956    3 Sheets-Sheet 1

INVENTOR.
JAY GRANT DE REMER
BY
Harold F. Wilhelm
ATTORNEY.

INVENTOR.
JAY GRANT DE REMER
BY Harold F. Wilhelm
ATTORNEY.

May 3, 1960   J. G. DE REMER   2,935,168
WASHING AND DRYING MACHINE AND DRIVE THEREFOR
Filed April 24, 1956   3 Sheets-Sheet 3

INVENTOR.
JAY GRANT DE REMER
BY
Harold F Wilhelm
ATTORNEY.

United States Patent Office 2,935,168
Patented May 3, 1960

2,935,168

WASHING AND DRYING MACHINE AND DRIVE THEREFOR

Jay Grant De Remer, Darien, Conn., assignor to J. G. De Remer Research Corporation, Union City, N.J., a corporation of New Jersey Application April 24, 1956, Serial No. 580,195

3 Claims. (Cl. 192—48)

The invention relates to laundry machines and more particularly to a laundry machine in which the clothes are placed in the same basket for washing and centrifugal drying.

A general object of the invention is to provide a simple, low cost transmission for washing and drying operations, and for shifting between these operations.

According to a preferred form of the invention, the machine comprises an imperforate type basket which holds water for washing and a separately operated wash agitator within the basket. The transmission uses but a single drive belt from the main drive motor, and a special gear box having concentric input and output shafts. Suitable gearing is provided in the gear box for converting uni-directional motion of the input drive sleeve to oscillatory motion of the output shaft. A shift assembly selectively engages a friction clutch between drive pulley and basket shaft on the one hand, and a friction clutch between drive pulley and gear box input shaft on the other hand. The engagement of the latter clutch also causes engagement of a jaw clutch between the agitator shaft and the gear box output shaft.

In the preferred form of the invention, the basket shaft and agitator shaft are journaled within a framework suitably supported by the frame of the machine. The gear box is suspended from the framework and a servo motor is suspended from the gear box. The servo motor operates shift mechanism connected to the drive clutches. This type suspension permits lowering the servo motor and gear box to replace the drive belt.

This invention constitutes an improvement over my application, Serial No. 448,454, filed August 9, 1954, entitled Washing and Drying Machine and Drive Therefor.

Other objects and features of the invention will be more apparent from the following description when considered with the following drawings in which.

Figure 1:
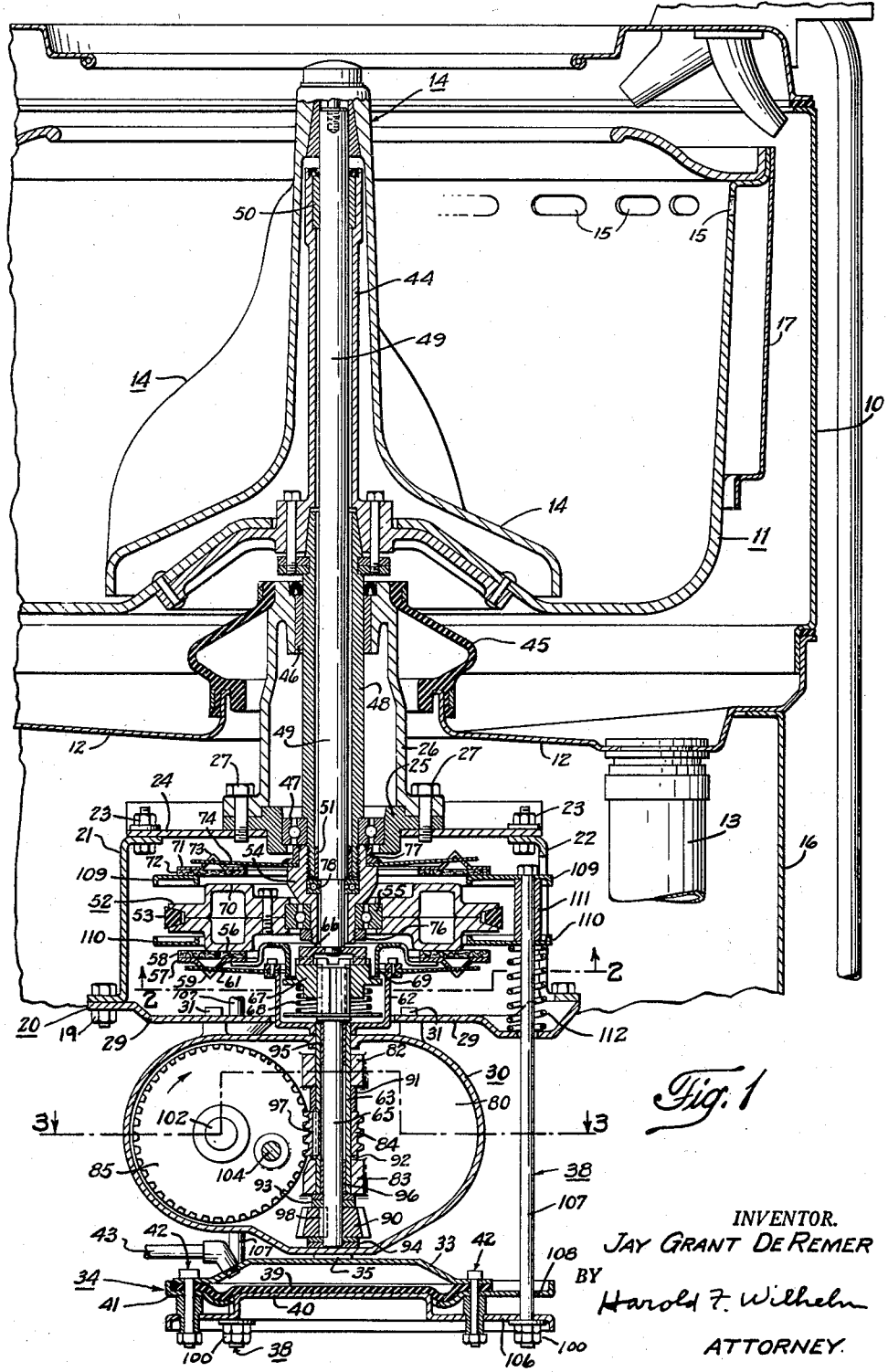
Fig. 1 is a vertical central section through the machine.

In the following description specific terms will be used for convenience of expression—but in the claims it is desired to give these terms the broadest meaning the prior art will permit.

Referring now to the drawings, the washing machine comprises in general a chassis 16 including a tank 10 in which is mounted an imperforate type clothes basket 11 for holding water during washing. The tank has a bottom 12 to which drain pipe 13 is connected. The basket contains agitator 14 which oscillates in a circular direction, when the basket is stationary, to wash clothes. When the basket 11 is rotated for centrifugal extraction, the water is expelled through holes 15.

The basket 11 has mounted thereon a liquid balance ring 17 receiving liquid from discharge openings 15 and operating according to the principles of my Patent No. 2,525,781, granted October 17, 1950, and my Patent No. 2,652,710, granted September 22, 1953. The details of basket and agitator form no part of the present invention and hence will not be further described.

The drive mechanism is mounted on a relatively stationary framework 20 which may be resiliently supported from the main chassis 16 of the machine. Such resilient support is not shown since it is unrelated to the present invention.

The framework 20 comprises a pair of girder members 21 and 22 flanged at the top and bolted at 23 to top plate 24. Fitting 25 is centered in top plate 24, and pedestal 26 is centered on fitting 25, the parts being connected by a series of bolts 27.

The girders 21 and 22 are connected to a bottom plate 29 which suspends gear case 30 by a series of bolts 31. The gear case in turn suspends the frame 33 of servo motor 34 by a series of straps 35, 36 and 37. See also Figs. 3, 4 and 5. Gear case 30 contains gearing, hereinafter described, driven by a tubular uni-directional input shaft 63 which surrounds an oscillatory rotary output shaft 65. The servo motor 34 operates a shift assembly 38, described hereinafter, for selectively applying a continuous rotary motion to hollow basket shaft 48 for centrifugal drying and an oscillatory rotary motion to inner agitator shaft 49 for washing.

Pedestal 26 is sealed to the tank bottom 12 by a flexible seal 45. Pedestal 26 contains bearings 46 and 47 for basket shaft 48. Inner agitator shaft 49 is journaled in bearing 50 supported by the hub 44 of basket 11 and in bearing 51 located within basket shaft 48.

A single drive pulley 52 selectively drives the basket shaft 48 for centrifugal extraction and agitator shaft 49 (through gearing in box 30) for agitating washing action. A series of clutches controls the washing and extracting actions as described below. Drive pulley 52 is journaled on bearing 55 which is supported on fitting 54. Pulley 52 is driven by belt 53 which is driven by a suitable electric drive motor (not shown).

The drive from pulley 52 to the agitator shaft 49 will now be described.

Figure 2:
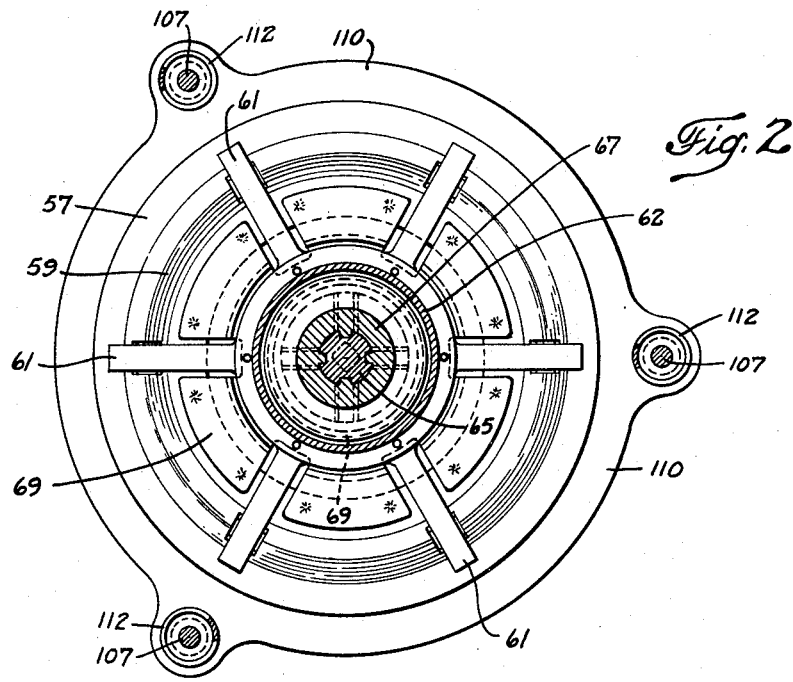
Fig. 2 is a plan section, on the line 2—2 of Fig. 1, illustrating the construction of the finger spring of the friction clutch connecting the drive pulley to the input drive sleeve in the gear box.

Pulley 52 has a lower friction surface 56 engageable with lining 58 attached to friction disc 57. Disc 57 has a V-shaped circular ridge 59 (Fig. 2) suitably slotted to receive fingers 61 of spring member secured to cup 62, which in turn is secured to input drive sleeve 63 in the gear box 30.

The continuous rotary motion applied to input sleeve 63 is converted by gearing in gear case 30 to apply an oscillatory rotary motion to output shaft 65. Shaft 65 has feather keyed thereto a slidable dog member 67 having jaws or dog teeth which interfit dog teeth of a cooperating clutch member 66 secured to agitator shaft 49. A helical spring 68 operating between a plate on output shaft 65 and dog member 67 urges the dog member into engagement with clutch member 66, under influence of a control ring 69 which engages a shoulder on dog member 67 and is spot-welded to the underside of friction disc 57.

Thus when brake shoe 110 forming part of shift mechanism 38 (hereinafter described) is lowered, it presses friction disc 57 downwardly, disengaging lining 58 from pulley 52; at the same time control ring 69 presses dog member 67 downwardly to disengage its teeth from the teeth on clutch member 66.

The drive mechanism from the drive pulley 52 to the outer basket shaft 48 will now be described.

Pulley 52 has an upper friction surface 70 engaging lining 72 of upper friction disc 71 having a slotted V-shaped ridge 73 similar to the lower friction disc 57. The slots on ridge 73 receive spring fingers 74 secured to fitting 54 by collar 77. Thus when brake shoe 109 is moved downwardly by the shift mechanism, the spring fingers 74 urge friction material 72 into engagement with friction surface 70 of drive pulley 52 to drive the basket for centrifugal extraction.

It will be noted that a nut 76 clamps the inner race of bearing 55 against a shoulder of fitting 54; that fitting 54 is screwed on shaft 48 clamping the inner race of bearing 47 against a shoulder on basket shaft 48. Bearing 47 takes the axial thrust of basket shaft 48, and axial thrust bearing 78 is interposed between the shoulder on fitting 54 and a shoulder on agitator shaft 49.

Figure 3:
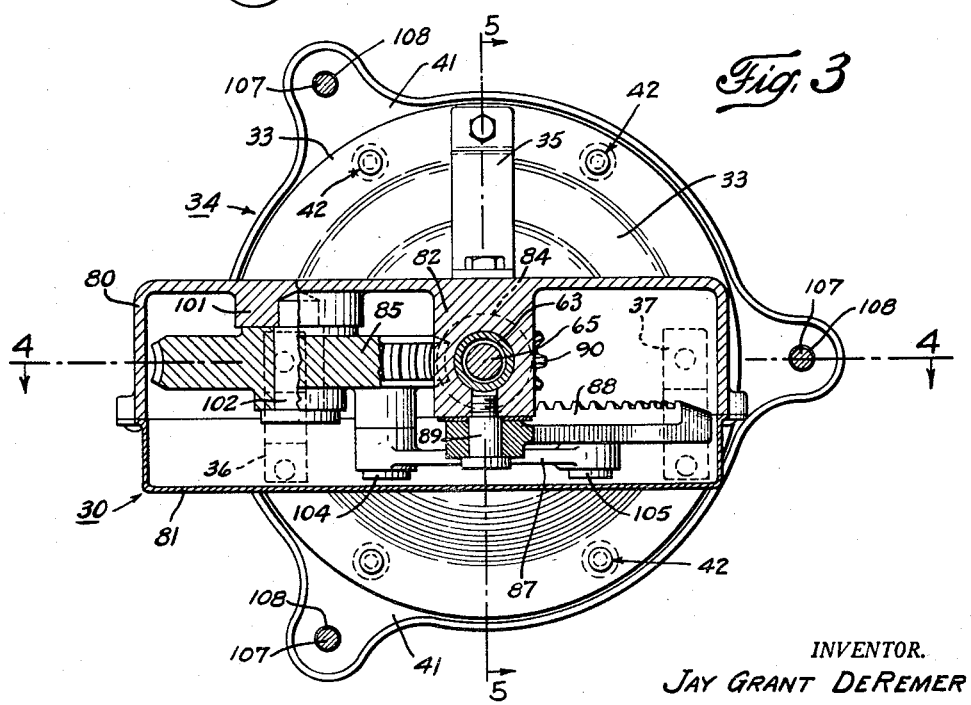
Fig. 3 is a plan section, on thhe line 3—3 of Fig. 1, illustrating the gear assembly in the gear box.
Figure 4:
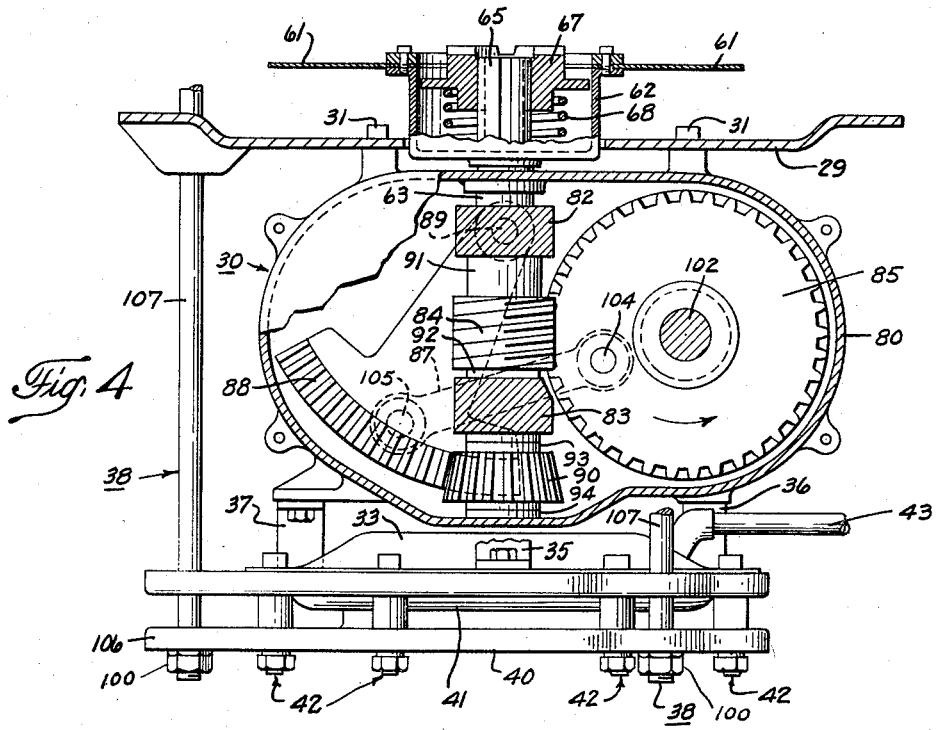
Fig. 4 is a sectional elevation, on the line 4—4 of Fig. 3, illustrating the gear assembly in the gear box.
Figure 5:
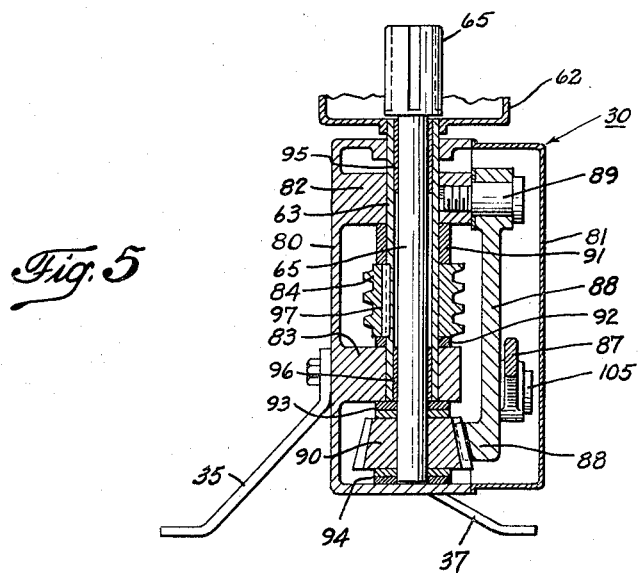
Fig. 5 is a section, on the line 5—5 of Fig. 3, further illustrating the gear assembly in the gear box.

Referring now also to Figs. 3 to 5, the gearing in gear box 30 will now be described.

Gear box 30 comprises a base 80 which supplies structural support for the gearing, and a removable cover 81. The case is suitably filled with lubricant and cover applied.

Base 80 supports upper and lower struts 82 and 83 providing bearings for tubular input shaft 63 which is driven by cup 62. A worm 84 is keyed at 97 to input shaft 63 and is spaced from upper and lower struts by spacers 91 and 92.

Output shaft 65 is journaled within input shaft 63 by bearing members 95 and 96. A bevel pinion 90 is keyed at 98 (Fig. 1) to output shaft 65. Spacers 93 and 94 are disposed over and under bevel pinion 90.

Worm 84 drives worm wheel 85 journaled on pin 102 suitably secured to boss 101 (Fig. 3). A sector swing bevel gear 88 is pivoted on pin 89 threaded to strut 82. A connecting rod 87 is pivoted to worm wheel 85 and to sector gear 88 by pins 104 and 105 respectively. The sector bevel gear 88 meshes bevel pinion 90.

Thus it will be seen that, as input cup 62 rotates unidirectionally, it causes sector gear 88 to oscillate about pivot pin 89 which in turn imparts an oscillatory rotary motion to output shaft 65, the latter rotating part of a revolution, first in one direction and then in the other direction. The output shaft 65 may oscillate through any arc necessary or desirable, as for example 205 degrees.

The shift assembly 38 will now be described.

The shift assembly controls selectively friction clutch 70—72 on the one hand, and friction clutch 56—58 and jaw clutch 66—67, on the other hand.

Shift assembly 38 includes servo motor 34 which has a flexible diaphragm 39 resting against plate 40. A binding ring 41, together with a series of bolt assemblies 42, tightly clamps the flexible diaphragm 39 to the servo motor frame 33. The conduit 43 supplies hydraulic fluid to the servo motor 34 to provide pressure to expand flexible diaphragm 39, which in turn depresses plate 40 and the entire shift assembly 38.

Plate 40 carries a series of radial arms 106 connected to rods 107 slidable in guide holes 108 on clamping ring 41. Rods 107 pass through the annular brake shoes 109 and 110, spacing tubes 111 being disposed between the brake shoes. A series of helical springs 112 operating between lower plate 29 and the lower brake shoe 110 urges both brake shoes upwardly against the downward hydraulic pressure generated by the servo motor 34. The bolt assemblies 42 have upper and lower abutments which limit movement of servo motor plate 40.

The parts in Fig. 1 are shown in the washing position. There is no hydraulic pressure in servo motor 34. Friction spin clutch 70—72 is disengaged and friction auxiliary clutch 56—58 and jaw agitator clutch 66—67 are both engaged to drive the agitator 14 for washing purposes. Brake shoe 109 engages friction lining 72 to hold the basket 11 stationary.

To shift to drying position, hydraulic pressure is applied to pipe 43 which expands servo motor 34. This depresses the entire shift assembly 38 which in turn removes brake shoe 109 from friction plate 72, permitting the latter to engage friction surface 70 on pulley 52. This causes pulley 52 to drive the hollow basket shaft 48, which drives the basket 11 at centrifugal extracting speed.

Downward movement of the shift assembly 38 also disengages friction clutch 56—58 and jaw clutch 66—67 which stops the gearing in gear box 30 and also frees agitator shaft 49, leaving agitator 14 free to rotate with the basket.

To shift back to washing position, hydraulic pressure is released in pipe 43. The springs 112 raise the entire shift assembly 38, disengaging friction clutch 70—72 and engaging friction clutch 56—58 and jaw clutch 66—67. Engagement of friction plate 71 with brake shoe 109 holds the hollow basket shaft 48 stationary, and brake shoe 110 frees friction clutch 56—58, thus driving gearing in gear box 30 and oscillating agitator shaft 49.

The above described invention provides a compact and low cost construction. The upper friction clutch operates not only as a disconnect clutch for removing power from the basket, but acts as a slip, or acceleration clutch which permits the heavy load of the basket filled with water and clothes to accelerate slowly without imposing undue torque on the motor. Thus no separate hydraulic, or other special clutch is needed to relieve the motor at the beginning of the centrifugal drying operation.

The simple jaw or dog toothed clutch engages smoothly, since the oscillatory drive shaft comes to rest at both ends of its oscillation, and the load imposed by the agitator is relatively small. Also the lower friction clutch removes power from the jaw clutch while it is engaging and disengaging. Thus a simple rugged electric motor may be used for driving both basket and agitator, and the motor is required to run only in one direction.

The present invention also eliminates the extra belt and extra drive pulley for driving the gearing in the gear box of the prior application, it provides a smaller gear box, and provides for attachment of the servo motor directly to the gear box.

The drive belt 53 may be removed and replaced in a most expeditious manner. It is only necessary to remove the nuts 100 on the bottom of the tension rods 107 and the nuts 19 securing bottom plate 29 to girder members 21 and 22. Bottom plate 29, suspended gear box 30 and servo motor 34 may then be dropped as a unit, together with friction disc 57, lining 58, finger spring 61 and all parts connected thereto. Springs 112 and lower brake shoe 110 will also drop. This gives direct access to the lower side of pulley 52 which is supported in cantilever fashion on fitting 54, permitting removal and replacement of the belt.

While certain novel features of the invention have been disclosed herein, and are pointed out in the annexed claims, it will be understood that various omissions, substitutions and changes may be made by those skilled in the art without departing from the spirit of the invention.

What is claimed is:

1. Drive mechanism for washing machines of the type having a clothes basket and an agitator in said basket, said drive mechanism comprising a hollow first rotary member, an inner first rotary member within said hollow member, a hollow second rotary member, an inner second rotary member within said hollow second rotary member, all said rotary members being generally coaxial, an outer clutch between said hollow first and second rotary members, and an inner clutch between said inner first and second rotary members.

2. In the drive mechanism of claim 1, said clutches each comprising at least one axially movable element and coaxial means connecting the movable elements of said inner and outer clutches.

3. The drive mechanism of claim 1, said outer clutch comprising a friction element secured to one hollow rotary member, an axially movable friction element attached to the other hollow rotary member, spring means urging said friction elements together, said inner clutch comprising a jaw member attached to one inner rotary member and an axially movable jaw member attached to the other inner rotary member, spring means urging said jaw members together, and an internal control member operating between the movable elements of said inner and outer clutches.

References Cited in the file of this patent

UNITED STATES PATENTS

| | | |
|---|---|---|
| 2,310,046 | Henderson | Nov. 3, 1942 |
| 2,346,669 | Dunham | Apr. 18, 1944 |
| 2,485,621 | McNairy | Oct. 25, 1949 |
| 2,485,622 | Bariffi | Oct. 25, 1949 |
| 2,609,697 | Ruscoe | Sept. 4, 1952 |
| 2,610,498 | Geldhof et al. | Sept. 16, 1952 |
| 2,648,212 | Sharp | Aug. 11, 1953 |
| 2,775,883 | Burris | Jan. 1, 1957 |